(12) United States Patent
Kondo et al.

(10) Patent No.: US 9,533,328 B2
(45) Date of Patent: Jan. 3, 2017

(54) CLEAR COATING COMPOSITION AND METHOD FOR COATING AUTOMOBILE BODY

(75) Inventors: Masuo Kondo, Saitama (JP); Keisuke Kojima, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 379 days.

(21) Appl. No.: 14/130,455

(22) PCT Filed: Jul. 12, 2012

(86) PCT No.: PCT/JP2012/067793
§ 371 (c)(1),
(2), (4) Date: Dec. 31, 2013

(87) PCT Pub. No.: WO2013/008879
PCT Pub. Date: Jan. 17, 2013

(65) Prior Publication Data
US 2014/0147597 A1    May 29, 2014

(30) Foreign Application Priority Data
Jul. 12, 2011 (JP) .................................. 2011-153977

(51) Int. Cl.
*B05D 7/14* (2006.01)
*C08G 18/54* (2006.01)
(Continued)

(52) U.S. Cl.
CPC .............. *B05D 7/14* (2013.01); *C08G 18/544* (2013.01); *C08G 18/6216* (2013.01);
(Continued)

(58) Field of Classification Search
None
See application file for complete search history.

(56) References Cited

U.S. PATENT DOCUMENTS

| 5,187,199 A | 2/1993 | Sudo |
| 5,516,559 A | 5/1996 | Rockrath et al. |

(Continued)

FOREIGN PATENT DOCUMENTS

| CN | 847344 A | 10/2006 |
| EP | 1 486 263 A2 | 12/2004 |

(Continued)

OTHER PUBLICATIONS

Office Action dated Nov. 19, 2015, issued in counterpart Chinese Application No. 201280032886.7.
(Continued)

*Primary Examiner* — Shamim Ahmed
*Assistant Examiner* — Bradford Gates
(74) *Attorney, Agent, or Firm* — Westerman, Hattori, Daniels & Adrian, LLP

(57) ABSTRACT

To provide a coating composition, which is capable of providing a coating film on a resin part and on a steel plate part at the same time at lower temperatures than conventional coating compositions, and which is capable of providing a coating film that has excellent bending resistance. A clear coating composition, which contains a base material that contains an acrylic polyol, a crosslinking agent that is composed of an active methylene type blocked isocyanate and a melamine resin, and a curing catalyst. The mass ratio of the base material to the melamine resin is 1.5-9.0, and the mass percentage of the active methylene type blocked isocyanate in the composition is set within a specific range when the total of the mass percentage of the base material and the mass percentage of the melamine resin in the composition is taken as 100% by mass.

4 Claims, 1 Drawing Sheet

(51) Int. Cl.
  *C08G 18/62* (2006.01)
  *C09D 5/16* (2006.01)
  *C08G 18/80* (2006.01)
  *C09D 175/04* (2006.01)
  *C09D 133/06* (2006.01)
  *C09D 4/00* (2006.01)
  *B05D 7/00* (2006.01)

(52) U.S. Cl.
  CPC ........... *C08G 18/8093* (2013.01); *C09D 4/00* (2013.01); *C09D 5/1662* (2013.01); *C09D 5/1687* (2013.01); *C09D 5/1693* (2013.01); *C09D 133/06* (2013.01); *C09D 175/04* (2013.01); *B05D 7/532* (2013.01); *C08G 2150/90* (2013.01)

(56) References Cited

U.S. PATENT DOCUMENTS

| | | | |
|---|---|---|---|
| 5,981,652 A | 11/1999 | Kawazu et al. | |
| 2005/0025978 A1* | 2/2005 | Okada | B05D 7/14 428/423.1 |
| 2006/0223953 A1 | 10/2006 | Drescher et al. | |
| 2009/0081373 A1* | 3/2009 | Choate | B05D 7/53 427/385.5 |
| 2010/0279005 A1* | 11/2010 | Vaes | C08G 18/003 427/140 |

FOREIGN PATENT DOCUMENTS

| | | |
|---|---|---|
| JP | 01-158079 A | 6/1989 |
| JP | 04-130168 A | 5/1992 |
| JP | 04-277065 A | 10/1992 |
| JP | 10-088010 A | 4/1998 |
| JP | 10-101995 A | 4/1998 |
| JP | 2001-139879 A | 5/2001 |
| JP | 2005-000787 A | 1/2005 |

OTHER PUBLICATIONS

Office Action dated Apr. 27, 2015, issued in corresponding Chinese Patent Application No. 201280032886.7 (8 pages).
Extended European Search Report dated Nov. 27, 2014, issued in corresponding European Patent Application No. 12810576.4 (5 pages).
International Search Report dated Aug. 21, 2012, issued in corresponding application No. PCT/JP2012/067793.

* cited by examiner

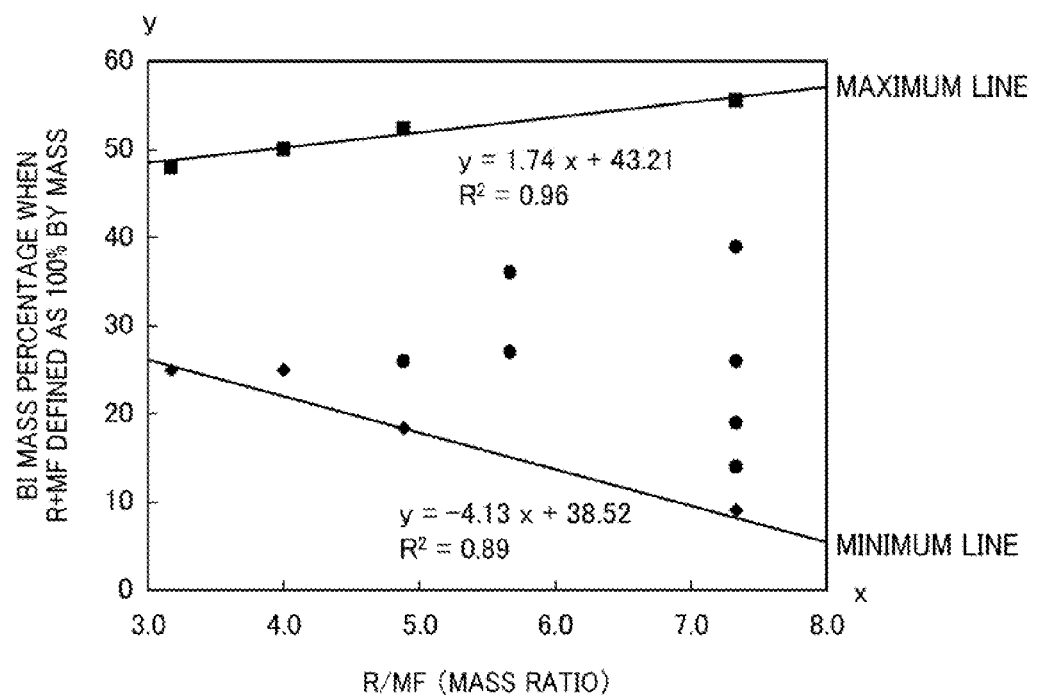

CLEAR COATING COMPOSITION AND METHOD FOR COATING AUTOMOBILE BODY

TECHNICAL FIELD

The present invention relates to a clear coating composition and a method for coating an automobile body.

BACKGROUND ART

Normally, automobile bodies are configured from a portion formed by resin components such as bumpers (hereinafter referred to as "resin part"), and a portion formed by steel sheet components such as the body (hereinafter referred to as "steel sheet part"). Herein, there is concern over the resin part deforming when baking, in the case of coating a coating of high baking temperature onto the resin part, since the heat resistance of resin components are greatly inferior compared to steel sheet components. For this reason, it is common practice to coat a suitable coating at suitable coating conditions on every respective part.

However, when coating different coatings on every respective part, deviation in hue occurs, and appearance of the automobile may decline. Therefore, development of a coating that can simultaneously coat both parts among a resin part and a steel sheet part, and nevertheless be of low-temperature curing type has been demanded.

For example, a technology for coating a water-based base coating containing melamine resin and emulsion resin obtained by emulsion polymerizing an ethylenically unsaturated monomer mixture containing methacrylic acid ester, and then coating wet-on-wet a clear coating with isocyanate as a curing agent (refer to Patent Document 1). According to this technology, it is said to be possible to form a coating film superior in low-temperature curability and well as being superior in adhesiveness, even in a case of simultaneously coating both parts among the resin part and steel sheet part.

In addition, as a low-temperature curing coating, for example, a clear coating for automobile bodies containing predetermined amounts of acrylic polyol, blocked isocyanate and melamine resin (refer to Patent Document 2), a top-coat coating for automobile bodies containing predetermined amounts of acrylic polyol, alkoxysilane and blocked isocyanate and melamine resin (refer to Patent Document 3), a water-based heat curable coating for automobile bodies containing predetermined amounts of acrylic polyol, blocked isocyanate and melamine resin (refer to Patent Document 4), etc. have been proposed.

[Patent Document 1] Japanese Unexamined Patent Application, Publication No. 2005-787
[Patent Document 2] Japanese Unexamined Patent Application, Publication No. H10-101995
[Patent Document 3] Japanese Unexamined Patent Application, Publication No. H10-88010
[Patent Document 4] Japanese Unexamined Patent Application, Publication No. 2001-139879

DISCLOSURE OF THE INVENTION

Problems to be Solved by the Invention

However, from the viewpoint of a reduction in consumed energy and a reducing in $CO_2$ emissions during coating film formation, further lowering of the temperature of the baking temperature has been demanded.

In addition, with the conventional technology, the coating film formed simultaneously on both parts among resin part and steel sheet part has been insufficient in bending resistance. For this reason, the durability of the coating film has been inadequate, and thus defects such as cracking may occur.

The present invention has been made taking the above into account, and the object thereof is to provide a coating composition that simultaneously form a coating film on both parts among resin part and steel sheet part at lower temperature than conventionally, as well as being able to form a coating film having superior bending resistance.

Means for Solving the Problems

In order to achieve the above-mentioned object, the present invention provides a clear coating composition to be simultaneously coated on both parts among the resin part and steel sheet part of an automobile body. A clear coating composition according to the present invention includes: a base resin containing acrylic polyol; a crosslinking agent consisting of an active methylene-type blocked isocyanate and melamine resin; and a curing catalyst, in which a mass ratio of the base resin to the melamine resin is 1.5 to 9.0, and when defining a total of mass percentage of the base resin and mass percentage of the melamine resin in the composition as 100% by mass, the minimum value for mass percentage of the active methylene-type blocked isocyanate in the composition is calculated according to formula (1) below, and the maximum value thereof is calculated according to formula (2) below.

[Math. 1]

$$\text{Minimum value} = -4.13 \times (\text{mass ratio of base resin to melamine resin}) + 38.52 \quad (1)$$

$$\text{Maximum value} = 1.74 - \times (\text{mass ratio of base resin to melamine resin}) + 43.21 \quad (2)$$

In the present invention, the clear coating composition is configured to contain the base resin containing acrylic polyol, the crosslinking agent consisting of active methylene-type blocked isocyanate and melamine resin, and the curing catalyst. In addition, the mass ratio of the base resin relative to the melamine resin is set to within the range of 1.5 to 9.0.

According to the present invention, by blending an active methylene-type blocked isocyanate having a property of curing at low temperature, in addition to the melamine resin, it is possible to bake to cure at a lower temperature than conventionally, e.g., a low temperature of 90° C. to 120° C. For this reason, for example, even without using heat resistant resin components (e.g., resin components blending glass filler), simultaneous coating is possible on both parts among the resin part and the steel sheet part of an automobile body, and thus it is possible to avoid deviation in hue occurring when coating each respective part.

In addition, with the present invention, the minimum value for the mass percentage of the active methylene-type blocked isocyanate in the composition is defined as a value calculated according to the aforementioned formula (1), and the maximum value is defined as a value calculated according to the aforementioned formula (2), when the total of the mass percentage of the base resin and the mass percentage of the melamine resin in the composition is defined as 100% by mass.

Herein, the cured product has a hard characteristic due to the melamine resin and base resin; whereas, the cured product of the blocked isocyanate and base resin has a soft characteristic. Therefore, according to the present invention, it is possible to appropriately control the elasticity of the coating film, by setting the mass percentage of the active methylene-type blocked isocyanate in the composition to within a specific range. More specifically, by defining the mass percentage of the active methylene-type blocked isocyanate in the composition as at least the above-mentioned minimum value, it is possible to make the coating film overall a flexible film while maintaining a fixed coating film hardness due to imparting of elasticity according to the cured product of blocked isocyanate and base resin, and a coating film having superior bending resistance is obtained. On the other hand, by defining the mass percentage of the active methylene-type blocked isocyanate in the composition as no more than the above-mentioned maximum value, it is possible to avoid the coating film from excessively softening and the permeability increasing, and thus it is possible to avoid declines in stain resistance and acid resistance.

It is preferable for the curing catalyst to contain dibutyltin dilaurate as a blocked isocyanate curing catalyst, and p-toluene sulfonic acid as a melamine curing catalyst.

In the present invention, the curing catalyst is configured to include dibutyltin dilaurate as the blocked isocyanate curing catalyst, and p-toluene sulfonic acid as the melamine curing catalyst.

It is thereby possible to cause the crosslinking reaction by the blocked isocyanate and the crosslinking reaction by the melamine resin to reliably progress, respectively, and more reliably cause the coating film to cure even under low-temperature conditions.

It is preferable for the curing catalyst to contain a melamine curing catalyst, and the clear coating composition to be a two-part coating composition consisting of a first liquid and a second liquid, the melamine resin being contained in the first liquid, and the melamine curing catalyst being contained in the second liquid.

In the present invention, the curing catalyst is configured to include a melamine curing catalyst. In addition, the clear coating composition is made as two-part type, with the melamine resin being contained in the first liquid, while the melamine curing catalyst is contained in the second liquid.

It is thereby possible to avoid the melamine resin having a characteristic of the crosslinking reaction progressing at low temperature from reacting with the base resin and curing prior to mixing the first liquid and second liquid, and then coating. In other words, a coating composition is obtained that excels in low-temperature curability during coating, while excelling in production engineerability.

In addition, A method for coating an automobile body includes: a base-coating coating step of simultaneously coating a base coating on both parts among a resin part and a steel sheet part of an automobile body to form a base coating film thereon; a clear-coating coating step of simultaneously coating a clear coating on both parts among the resin part and the steel sheet part on which the base coating film was formed to form a clear coating film thereon; and a curing step of baking the clear coating film to cure, in which the clear coating composition as described in any one of claims 1 to 3 is coated in the clear-coating coating step.

In the present invention, the aforementioned clear coating composition is used in a method for coating that simultaneously coats a base coating on both parts among resin part and steel sheet part of an automobile body, and then simultaneously coating a clear coating and allowing to cure. The same effects as the invention of the aforementioned clear coating composition are exerted according to the present invention.

It is preferable to further include: an electrocoating step of electrocoating a steel sheet component forming the steel sheet part, prior to the base-coating coating step; and an assembly step of assembling the steel sheet component thus electrocoated and a resin component forming the resin part so as to make a set of an automobile body, in which the clear coating is coated wet-on-wet in the clear-coating coating step, and the base coating film and the clear coating film are simultaneously baked to cure in the curing step.

In the present invention, the resin components are assembled to the electrocoated steel sheet components to construct the automobile body, and the base coating is coated on this. Moreover, subsequently, the clear coating is coated wet-on-wet, and the base coating film and clear coating film are simultaneously baked to cure.

Normally, the coating film formed by wet-on-wet coating has a characteristic of being difficult to cure; however, since the clear coating composition according to the present invention excels in low-temperature curability, it is possible to cause the coating film to reliably cure even under low-temperature conditions, and thus a coating film can be formed that excels in bending resistance, stain resistance and acid resistance. In other words, the clear coating composition according to the present invention is suited to wet-on-wet coating.

Effects of the Invention

According to the present invention, it is possible to provide a coating composition that can form a coating film simultaneously on both parts among a resin part and a steel sheet part at lower temperature than conventionally, as well as being able to form a coating film having superior bending resistance.

BRIEF DESCRIPTION OF THE DRAWINGS

FIG. 1 is a graph showing a relationship between the mass ratio of base resin to melamine resin, and the mass percentage of active methylene-type blocked isocyanate in the composition, when defining the total of mass percentage of base resin and mass percentage of melamine resin in the composition as 100% by mass.

PREFERRED MODE FOR CARRYING OUT THE INVENTION

Hereinafter, an embodiment of the present invention will be explained.

A clear coating composition according to the embodiment of the present invention cures at lower temperature than conventionally; therefore, simultaneous coating on both parts among a resin part and a steel sheet part of an automobile body is possible. Herein, resin components forming the resin part are exterior components such as bumpers and resin fenders, for example, and steel sheet components forming the steel sheet part are the body, for example.

The clear coating composition according to the present embodiment is a two-part clear coating composition consisting of a first liquid and a second liquid, and prior to coating, the first liquid and the second liquid are mixed, and then coated. The clear coating composition according to the present embodiment is configured to contain a base resin, a crosslinking agent and a curing catalyst.

The base resin is configured to contain an acrylic polyol. As the acrylic polyol, an acrylic polyol having an OHV (hydroxyl value) of 80 to 200 KOH mg/g can be preferably used.

The acrylic polyol causes the coating film to cure by a crosslinking reaction of the hydroxyl group thereof with a melamine resin or active methylene-type blocked isocyanate described later.

It should be noted that, by appropriately setting the glass transition temperature (Tg), molecular weight, acid value, etc. of the acrylic polyol, it is possible to form curable coating films having different physical properties.

The crosslinking agent is configured from a melamine resin and an active methylene-type blocked isocyanate.

A commercial product can be used as the melamine resin. Preferably, a melamine resin having a high degree of alkylation, e.g., hexamethoxy methylated melamine resin "CYMEL (registered trademark) 300" manufactured by Nihon Cytec Industries Inc., is used. Due to having high reactivity, the melamine resin with a high degree of alkylation causes the coating film to cure at lower temperature by the crosslinking reaction progressing.

It should be noted that, by appropriately setting the degree alkylation degree of the melamine resin, molecular weight, etc., it is possible to form cured coating films having different physical properties.

A commercial product can be used as the active methylene-type blocked isocyanate. For example, "Duranate (registered trademark) MF-K60X" manufactured by Asahi Kasei Chemicals Corp. in which 1,6-hexamethylene diisocyanate is blocked by an active methylene-type blocking agent is preferably used.

Herein, blocked isocyanate is an isocyanate compound in which a free isocyanate group is blocked by a blocking agent. The blocked isocyanate causes the coating film to cure by the blocking agent dissociating and the isocyanate group regenerating due to heating, and then a crosslinking reaction with the hydroxy group of the acrylic polyol. At this time, a urethane bond is formed by the crosslinking reaction between the isocyanate and acrylic polyol.

In addition, active methylene-type blocked isocyanate indicates an isocyanate compound blocked by an active methylene-type blocking agent having an active methylene group. The active methylene-type blocking agent has a characteristic of dissociating at lower temperature; therefore, the active methylene-type blocked isocyanate causes the coating film to cure by the crosslinking reaction progressing at lower temperature.

As the active methylene-type blocking agent, for example, dimethyl malonate, diethyl malonate, methyl acetate, ethyl acetate, acetylacetone, etc. can be used.

Usually, the isocyanate compound is configured from a monomer, dimer and trimer. The main components of the isocyanate compound are the dimer uretodione structure and trimer isocyanurate structure, and these account for about 99.5% thereof. The monomer constituting the remaining about 0.5% is said to have high toxicity to organisms; however, according to a blocked isocyanate in which the isocyanate group is blocked by a blocking agent, the high toxicity thereof is avoided.

The curing catalyst is configured to contain a melamine curing catalyst and a blocked isocyanate curing catalyst.

As the melamine curing catalyst, strong acid catalysts such as an organic sulfonic acid, dodecylbenzene sulfonic acid, dinonylnaphthalene disulfonic acid, dinonylnaphthalene sulfonic acid and p-toluene sulfonic acid are used preferably.

As the blocked isocyanate curing catalyst, dibutyltin dilaurate (DBTDL), dibutyltin bis-o-phenylphenate, dibutyltin marate, dibutyltin diacetate, dibutyltin dilaurylmercaptide, dimethyltin dichloride, etc. are used preferably.

It should be noted that the melamine curing catalyst is contained in a different liquid from the liquid in which the melamine resin is contained. More specifically, in the case of the melamine resin being contained in the first liquid, the melamine curing catalyst will be contained in the second liquid. The melamine resin thereby will not react with the base resin and cure prior to coating.

With the clear coating composition according to the present embodiment, it is sufficient so long as having the melamine resin and melamine curing catalyst contained in different liquids, and each of the other components may be contained in either of the first liquid and the second liquid. For example, all components other than the melamine curing catalyst may be contained in the first liquid, and only the melamine curing catalyst contained in the second liquid.

In addition, with the clear coating composition according to the present embodiment, the mass ratio of the base resin relative to the melamine resin is set within the range of base resin/melamine resin=60/40 to 90/10=1.5 to 9.0. By blending the appropriate amount of active methylene-type blocked isocyanate as the crosslinking agent as described later, according to the mass ratio of the base resin to the melamine resin being within the range of 1.5 to 9.0, the coating film cures at lower temperature than conventionally, as well as a coating film being obtained having superior bending resistance while maintaining a constant coating film hardness.

In addition, with the clear coating composition according to the present embodiment, the minimum value for the mass percentage of the active methylene-type blocked isocyanate in the composition is calculated according to the following formula (1), and the maximum value is calculated by the following formula (2), when the total of the mass percentage of base resin and the mass percentage of melamine resin in the composition is defined as 100% by mass.

[Math. 2]

$$\text{Minimum value} = -4.13 \times (\text{mass ratio of base resin to melamine resin}) + 38.52 \quad (1)$$

$$\text{Maximum value} = 1.74 \times (\text{mass ratio of base resin to melamine resin}) + 43.21 \quad (2)$$

By the mass percentage of the active methylene-type blocked isocyanate in the composition being at least the above-mentioned minimum value, it is possible to make the coating film overall a flexible film while maintaining a certain coating film hardness due to imparting of elasticity according to the cured product of blocked isocyanate and base resin, and a coating film having superior bending resistance is obtained. On the other hand, by the mass percentage of the active methylene-type blocked isocyanate in the composition being no more than the above-mentioned maximum value, it is possible to avoid the coating film from excessively softening and the permeability increasing, and thus it is possible to avoid declines in stain resistance and acid resistance.

It should be noted that the clear coating composition according to the present embodiment is not concerned with being an aqueous system or an organic solvent system. In addition, predetermined amounts of various additives and various solvents may be contained. It is not limited in regards to production method, and can be produced according to a conventional, well-known preparation method.

Next, a method for coating an automobile body using the clear coating composition according to the present embodiment will be explained.

The method for coating an automobile body according to the present embodiment includes a base-coating coating step, a clear-coating coating step, and a curing step.

In the base-coating coating step, a base-coating film is formed by simultaneously coating the base coating on both parts among the resin part and steel sheet part of the automobile body. A conventional, well-known base coating can be used as the base coating.

In the clear-coating coating step, a clear coating film is formed by simultaneously coating a clear coating on both parts among the resin part and steel sheet part of the automobile body. The clear coating according to the present embodiment mentioned above is used as the clear coating.

In the curing step, the clear coating film is baked to cure at a predetermined temperature. For example, it can be made to cure at a low temperature of 90° C. to 120° C., and depending on the resin materials selected, it can be made to cure at a low temperature of 90° C. to 110° C. The heating time can be set to between 20 to 60 minutes, for example.

In the method for coating an automobile body according to the present embodiment, prior to the base-coating coating step, it preferably includes an electrocoating step of electrocoating steel sheet components forming the steel sheet part, and an assembly step of assembling the electrocoated steel sheet components and the resin components forming the resin part to make one set automobile body.

In this case, it is preferable for the clear coating to be coated wet-on-wet in the clear-coating coating step, and the base coating film and the clear coating film to be baked to cure simultaneously in the curing step. The effects of the clear coating composition of the present embodiment, which excels in low-temperature curability, are thereby greatly exhibited.

The method for coating according to the present embodiment is preferably applied to the so-called 4C3B coating technique. Herein, 4C3B is a coating technique of conducting intermediate-coat coating after electrocoating and electrocoat drying, then baking to cure the intermediate-coat coating film in intermediate-coat drying, followed by sequentially coating the base coating film and clear coating film wet-on-wet and simultaneously baking to cure.

In this 4C3B, the resin components are preferably applied a conductive primer, and then inserted in the step after the intermediate-coat drying of the steel sheet components. After insertion, the resin components and steel sheet components are assembled to make the automobile body, and then the base coating film and the clear coating film are sequentially coated wet-on-wet, followed by simultaneously baking to cure. In this case, the base coating film may be a configuration of two or more layers.

In addition, the method for coating according to the present embodiment can also be applied to the so-called 4C2B coating technique. Herein, 4C2B is a coating technique in which the intermediate-coat drying step of the aforementioned 4C3B is omitted from the viewpoint of a reduction in $CO_2$ emissions.

In this 4C2B, the resin components are preferably applied a conductive primer, and then inserted in the step after the electrocoat drying of the steel sheet components. After insertion, the resin components and steel sheet components are assembled to make the automobile body, and then the base coating film and the clear coating film are sequentially coated wet-on-wet, followed by simultaneously baking to cure. However, the resin components are inserted in the step after intermediate-coat preheating of the steel sheet components, and intermediate-coat coating does not need to be performed for the resin components.

In addition, the method for coating according to the present embodiment can also be applied to the so-called 3C2B coating technique. Herein, 3C2B is a coating technique in which the intermediate-coat coating step of the aforementioned 4C2B is omitted, and the base coating film is made a two-layer configuration from the viewpoint of a reduction in $CO_2$ emissions.

In this 3C2B, the resin components are preferably applied a conductive primer, and then inserted in the step after the electrocoat drying of the steel sheet components. After insertion, the resin components and steel sheet components are assembled to make the automobile body, and then the base coating film (two-layer configuration) and the clear coating film are sequentially coated wet-on-wet, followed by simultaneously baking to cure.

In any of the aforementioned coating techniques, the top coat coating step of resin components such as bumpers, which has conventionally been performed separately, becomes unnecessary as stated above.

It should be noted that, in any of the aforementioned coating techniques, a predetermined pretreatment step is preferably included prior to the electrocoating of steel sheet components. In addition, auxiliary material step to apply sealers such as a dust sealer, soundproofing undercoat and a melting sheet, and a chipping primer coating step may be included after the electrocoat drying of the steel sheet components. Regarding the chipping primer, it may be consolidated with the conductive primer.

According to the present embodiment, the following effects are exerted.

In the present embodiment, the clear coating composition is configured to contain the base resin containing acrylic polyol, the crosslinking agent consisting of active methylene-type blocked isocyanate and melamine resin, and the curing catalyst. In addition, the mass ratio of the base resin relative to the melamine resin is set to within the range of 1.5 to 9.0.

According to the present embodiment, by blending an active methylene-type blocked isocyanate having a property of curing at low temperature, in addition to the melamine resin, it is possible to bake to cure at a lower temperature than conventionally, e.g., a low temperature of 90° C. to 120° C. For this reason, for example, even without using heat resistant resin components (e.g., resin components blending glass filler), simultaneous coating is possible on both parts among the resin part and the steel sheet part of an automobile body, and thus it is possible to avoid deviation in hue occurring when coating each respective part.

In addition, with the present embodiment, the minimum value for the mass percentage of the active methylene-type blocked isocyanate in the composition is defined as a value calculated according to the aforementioned formula (1), and the maximum value is defined as a value calculated according to the aforementioned formula (2), when the total of the mass percentage of the base resin and the mass percentage of the melamine resin in the composition is defined as 100% by mass.

Herein, the cured product has a hard characteristic due to the melamine resin and base resin; whereas, the cured product of the blocked isocyanate and base resin has a soft characteristic. Therefore, according to the present embodiment, it is possible to appropriately control the elasticity of the coating film, by setting the mass percentage of the active methylene-type blocked isocyanate in the composition to within a specific range. More specifically, by defining the mass percentage of the active methylene-type blocked isocyanate in the composition as at least the above-mentioned minimum value, it is possible to make the coating film overall a flexible film while maintaining a fixed coating film hardness due to imparting of elasticity according to the cured product of blocked isocyanate and base resin, and a coating film having superior bending resistance is obtained. On the other hand, by defining the mass percentage of the active methylene-type blocked isocyanate in the composition as no more than the above-mentioned maximum value, it is possible to avoid the coating film from excessively softening and the permeability increasing, and thus it is possible to avoid declines in stain resistance and acid resistance.

In addition, in the present embodiment, the curing catalyst is configured to include dibutyltin dilaurate as the blocked isocyanate curing catalyst, and p-toluene sulfonic acid as the melamine curing catalyst.

It is thereby possible to cause the crosslinking reaction by the blocked isocyanate and the crosslinking reaction by the melamine resin to reliably progress, respectively, and more reliably cause the coating film to cure.

In addition, in the present embodiment, the curing catalyst is configured to include a melamine curing catalyst. In addition, the clear coating composition is made as two-part type, with the melamine resin being contained in the first liquid, while the melamine curing catalyst is contained in the second liquid.

It is thereby possible to avoid the melamine resin having a characteristic of the crosslinking reaction progressing at low temperature from reacting with the base resin and curing prior to mixing the first liquid and second liquid, and then coating. In other words, a coating composition is obtained that excels in low-temperature curability during coating, while excelling in production engineerability.

In addition, in the present embodiment, the aforementioned clear coating composition is used in a method for coating that simultaneously coats a base coating on both parts among resin part and steel sheet part of an automobile body, and then simultaneously coating a clear coating and allowing to cure. The same effects as the invention of the aforementioned clear coating composition are thereby exerted.

In addition, in the present embodiment, the resin components are assembled to the electrocoated steel sheet components to construct the automobile body, and the base coating is coated on this. Moreover, subsequently, the clear coating is coated wet-on-wet, and the base coating film and clear coating film are simultaneously baked to cure.

Normally, the coating film formed by wet-on-wet coating has a characteristic of being difficult to cure; however, since the clear coating composition according to the present embodiment excels in low-temperature curability, it is possible to cause the coating film to reliably cure even under low-temperature conditions, and thus a coating film can be formed that excels in bending resistance, stain resistance and acid resistance. In other words, the clear coating composition according to the present embodiment is suited to wet-on-wet coating.

It should be noted that the present invention is not to be limited to the above-mentioned embodiment, and that modifications, improvements, etc. within a scope that can achieve the object of the present invention are included in the present invention.

EXAMPLES

Next, the present invention will be explained in further detail based on examples; however, the present invention is not to be limited to these.

(Preparation of Clear Coating Composition)

Using an acrylic polyol having an OHV (hydroxyl value) of 150 KOH mg/g, hexamethoxy methylated melamine resin "CYMEL (registered trademark) 300" manufactured by Nihon Cytec Industries Inc., active methylene-type blocked isocyanate "Duranate (registered trademark) MF-K60X" manufactured by Asahi Kasei Chemicals Corp. in which 1,6-hexamethylene diisocyanate is blocked by an active methylene compound, the respective components were blended at the proportions shown in Table 1, thereby preparing the respective clear coating compositions of Examples 1 to 15 and Comparative Examples 1 to 4.

(Coating)

Coating was conducted separately on the bumpers of resin components and the body of steel sheet components. However, the coating conditions and curing conditions of the base coating composition and the coating conditions and curing conditions of the clear coating composition were the same for the bumpers and body.

(Bumper)

The surface of a polypropylene material for bumpers was cleaned in advance with tap water, and then a conductive primer "RB-116" manufactured by Nippon Bee Chemical Co., Ltd. was applied to form a conductive primer coating film having a film thickness of 10 μm.

Next, a base resin, in which the melamine resin and the blocked isocyanate of the crosslinking agent (both same as that blended in clear coating) were blended at the proportions shown in Table 2 to a base resin "R-301" manufactured Nippon Bee Chemical Co., Ltd., was applied to form a base coating film having a film thickness of 12 μm.

Next, each of the clear coatings of Examples 1 to 15 and Comparative Examples 1 to 4 prepared in the above way were respectively applied to form each clear coating films having a film thickness of 30 μm. After applying, the primer coating film, base coating film and clear coating film were made to cure by conducting bake drying for 20 minutes at 90° C.

(Body)

To impart rust-prevention to the body of steel sheet components, cation electrocoating was conducted. After electrocoating, an intermediate coat coating in which the melamine resin and blocked isocyanate of the crosslinking agent (both the same as that blended with clear coating) were blended at the proportions shown in Table 2 to the base resin "Polyurexcel P-1000" manufactured by Nippon Paint Co., Ltd., was applied. After applying, preheating was conducted for 5 minutes at 90° C.

Next, at the same coating conditions and curing conditions as the case of the bumpers, the base coating film and clear coating film were formed and made to cure.

The same evaluations for both the bumpers and body were conducted for the respective cured coating films of Examples 1 to 15 and Comparative Examples 1 to 4 obtained in the above way. More specifically, evaluations for the stain resistance, bending resistance and acid resistance were conducted in accordance with the below evaluation methods.

(Evaluation Methods)

(Stain Resistance)

Artificial soot was sprayed onto the cured coating films, and then left for 24 hours under a 95% humidity environment at 50° C. Next, after washing the surface of the coating film with a detergent, it was rinsed with water. A film for which a stain was confirmed visually on the cured coating film after water rinsing was judged as "X", and a film for which no stains were confirmed was judged as "O".

(Bending Resistance)

The cured coating film was made to bend to 90° in a state in which a steel rod with a diameter of 50 mm was pushed onto the cured coating film. At this time, a film in which cracking was confirmed in the cured coating film was judged as "X", and a film in which no cracks were confirmed was judged as "O".

(Acid Resistance)

Artificial acid rain was dropped onto the cured coating film, and left for 1.5 hours under a 70° C. environment. Next, the surface of the cured coating film was rinsed with a stream of water, and moisture was wiped off with a soft cloth. Subsequently, the surface roughness of the cured coating film was measured using a surface roughness gauge, and film in which etching depth was 1.0 μm or more was judged as "X", and that less than 1.0 μm was judged as "O".

and respective Comparative Examples, they are shown as common evaluation results of the body and bumper.

As shown in Table 1, the cured coating films of Comparative Examples 1 to 4 were all found to have evaluations for bending resistance or acid resistance of X. In contrast, the cured coating films of Examples 1 to 15 were confirmed to have evaluations for all of stain resistance, bending resistance and acid resistance of "O", despite having been cured at a low temperature of 90° C.

Herein, the relationships of the respective contents of acrylic polyol, melamine resin and active methylene-type blocked isocyanate in the clear coating compositions of Examples 1 to 15 for which the evaluation results for stain resistance, bending resistance and acid resistance were all "O" will be considered while referencing FIG. 1.

FIG. 1 is a graph showing the relationships between the mass ratio of acrylic polyol relative to melamine resin (x axis), and mass percentage of active methylene-type blocked isocyanate in the composition when defining the total of the mass percentage of acrylic polyol and the mass percentage of melamine resin in the composition as 100% by mass (y axis), based on the blending of the clear coating compositions of Examples 1 to 15 shown in Table 1. In FIG. 1, R represents the acrylic polyol, MF represents the melamine resin, and BI represents the active methylene-type blocked isocyanate.

TABLE 1

|  | Comparative Example | | | | Example | | | | | | | | | | | | | | |
| --- | --- | --- | --- | --- | --- | --- | --- | --- | --- | --- | --- | --- | --- | --- | --- | --- | --- | --- | --- |
|  | 1 | 2 | 3 | 4 | 1 | 2 | 3 | 4 | 5 | 6 | 7 | 8 | 9 | 10 | 11 | 12 | 13 | 14 | 15 |
| Acrylic polyol R (% by mass) | 65 | 75 | 85 | 65 | 76 | 76 | 80 | 80 | 83 | 83 | 83 | 85 | 85 | 88 | 88 | 88 | 88 | 88 | 88 |
| Melamine resin MF (% by mass) | 35 | 25 | 15 | 35 | 24 | 24 | 20 | 20 | 17 | 17 | 17 | 15 | 15 | 12 | 12 | 12 | 12 | 12 | 12 |
| R/MF (mass ratio) | 1.9 | 3 | 5.7 | 1.9 | 3.2 | 3.2 | 4 | 4 | 4.9 | 4.9 | 4.9 | 5.7 | 5.7 | 7.3 | 7.3 | 7.3 | 7.3 | 7.3 | 7.3 |
| Blocked isocyanate BI (% by mass) | 0 | 0 | 0 | 19 | 25 | 48 | 25 | 50 | 18 | 26 | 52 | 27 | 36 | 9 | 14 | 19 | 26 | 39 | 52 |
| p-toluene sulfonic acid (% by mass) | 1 | 1 | 1 | 1 | 1 | 1 | 1 | 1 | 1 | 1 | 1 | 1 | 1 | 1 | 1 | 1 | 1 | 1 | 1 |
| DBTDL (% by mass) | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Stain resistance | O | O | O | O | O | O | O | O | O | O | O | O | O | O | O | O | O | O | O |
| Bending resistance | X | X | X | X | O | O | O | O | O | O | O | O | O | O | O | O | O | O | O |
| Acid resistance | X | X | X | O | O | O | O | O | O | O | O | O | O | O | O | O | O | O | O |

TABLE 2

|  | Intermediate coat coating | Base coating |
| --- | --- | --- |
| Base resin Polyurexcel P-1000 (% by mass) | 85 | — |
| Base resin R-301 (% by mass) | — | 85 |
| Melamine resin MF (% by mass) | 15 | 15 |
| Blocked isocyanate BI (% by mass) | 27 | 27 |
| p-toluene sulfonic acid (% by mass) | 1 | 1 |
| DBTDL (% by mass) | 0.1 | 0.1 |

The evaluation results are as shown in Table 1. It should be noted that, since the evaluation results were the same for the body and bumper for each of the respective Examples As shown in FIG. 1, the minimum value and maximum value for the mass percentage of active methylene-type blocked isocyanate in the composition when defining the total of the mass percentage of acrylic polyol and the mass percentage of melamine resin in the composition as 100% by mass are respectively found to be in a fixed linear relationship with the mass ratio of the acrylic polyol relative to the melamine resin (hereinafter referred to as "R/MF").

More specifically, a certain relationship between the minimum value and R/MF is represented by a minimum line defined by y=−4.13x+38.52, which was calculated according to the least-squares method using the data of Examples 1, 3, 5 and 10.

In addition, a certain relationship between the maximum value and R/MF is represented by a maximum line defined by y=1.74x+43.21 calculated according to the least-squares method using the data of Examples 2, 4, 7 and 15.

From the above results, it was confirmed that a certain minimum value is calculated according to the aforementioned formula (1), and a certain maximum value is calculated according to the aforementioned formula (2).

In addition, when calculating the minimum value according to the above-mentioned formula using the value of R/MF of Comparative Example 4, it was calculated as about 31% by mass. In contrast, since the mass percentage of the active methylene-type blocked isocyanate in the composition when defining the total of the mass percentage of acrylic polyol and the mass percentage of melamine resin in the composition of Comparative Example 4 as 100% by mass was 19% (refer to Table 1), it was confirmed that Comparative Example 4 greatly falls below the minimum value.

The invention claimed is:

1. A method for coating an automobile body, comprising:
a base-coating coating step of simultaneously coating a base coating on both parts among a resin part and a steel sheet part of an automobile body to form a base coating film thereon;
a clear-coating coating step of simultaneously coating a clear coating on both parts among the resin part and the steel sheet part on which the base coating film was formed to form a clear coating film thereon; and
a curing step of baking the dear coating film to cure,
wherein the clear-coating coating step coats a clear coating composition that comprises:
a base resin containing acrylic polyol;
a crosslinking agent consisting of an active methylene blocked isocyanate and melamine resin; and
a curing catalyst that contains dibutyltin dilaurate as a blocked isocyanate curing catalyst, and p-toluene sulfonic acid as a melamine curing catalyst,
wherein a mass ratio of the base resin to the melamine resin is 1.5 to 9.0,
when defining a total of mass percentage of the base resin and mass percentage of the melamine resin in the composition as 100% by mass, the minimum value for mass percentage of the active methylene blocked isocyanate in the composition is calculated according to formula (1) below, and the maximum value thereof is calculated according to formula (2) below, and
wherein the base-coating coating step coats a base coating that contains the active methylene blocked isocyanate and the melamine resin, which are the same as those blended in the clear coating composition,

[Math. 1]

$$\text{Minimum value} = -4.13 \times (\text{mass ratio of base resin to melamine resin}) + 38.52 \quad (1)$$

$$\text{Maximum value} = 1.74 \times (\text{mass ratio of base resin to melamine resin}) + 43.21 \quad (2).$$

2. A method for coating an automobile body according to claim 1,
wherein the clear coating composition is a two-part coating composition consisting of a first liquid and a second liquid,
the melamine resin being contained in the first liquid, and
the melamine curing catalyst being contained in the second liquid.

3. A method for coating an automobile body according to claim 1, further comprising:
an electrocoating step of electrocoating a steel sheet component forming the steel sheet part, prior to the base-coating coating step; and
an assembly step of assembling the steel sheet component thus electrocoated and a resin component forming the resin part so as to make a set of an automobile body,
wherein the clear coating is coated wet-on-wet in the clear-coating coating step, and
wherein the base coating film and the clear coating film are simultaneously baked to cure in the curing step.

4. A method for coating an automobile body according to claim 2, further comprising:
an electrocoating step of electrocoating a steel sheet component forming the steel sheet part, prior to the base-coating coating step; and
an assembly step of assembling the steel sheet component thus electrocoated and a resin component forming the resin part so as to make a set of an automobile body,
wherein the clear coating is coated wet-on-wet in the clear-coating coating step, and
wherein the base coating film and the clear coating film are simultaneously baked to cure in the curing step.

* * * * *